United States Patent Office 3,565,749
Patented Feb. 23, 1971

3,565,749
HIGH TEMPERATURE RESISTANT STRUCTURES
Irvin Wizon, Swarthmore, Pa., assignor to FMC Corporation, Philadelphia, Pa., a corporation of Delaware
No Drawing. Continuation-in-part of application Ser. No. 332,301, Dec. 20, 1963, which is a continuation-in-part of application Ser. No. 213,138, July 30, 1962. This application Feb. 27, 1967, Ser. No. 623,497
Int. Cl. C04b 31/06, 35/64
U.S. Cl. 161—207
11 Claims

ABSTRACT OF THE DISCLOSURE

Ablative and high temperature resistant articles formed by shaping into a desired structure a cellulosic solution containing a metal compound which is converted into a hydrate of a glass- or lattice-forming metal or inorganic oxide and processing the shaped structure to remove the solvent, solidify the cellulosic material and polymerize the inorganic oxide hydrate. Application of heat to the structure in the absence of oxygen converts the structure to an inorganic oxide-carbon product and subsequently to an inorganic or metal carbide. Heat applied to the structure in the presence of oxygen converts the structure to an organic oxide product.

This application is a continuation-in-part of my application Ser. No. 332,301, filed Dec. 20, 1963 which application is a continuation-in-part of my application Ser. No. 213,138, filed July 30, 1962, both now abandoned.

This invention relates to high temperature resistant sinterable and/or sintered shaped bodies such as, for example, films, fibers, plates and the like and to a method of forming such bodies.

In the past, high temperature resistant shaped bodies have been formed or substances which themselves remain substantially unaltered under the conditions existing at the certain high temperatures. Presently, bodies are formed of mixtures of substances so that the shaped body may be considered as an ablative article. In this type article or body, certain of the constituents are not in themselves resistant to the high temperature conditions but dissipate energy by becoming transformed from one form or state to another and may then become ablated. However, other constituents are resistant to the higher temperatures and retain the physical form or structure of the original body. The present invention relates to shaped bodies which may be classed as ablative structure which, during use, are transformed or converted into sintered ceramic structures and to sintered ceramic structures.

The termed "ceramic" is used herein to designate metal or inorganic oxides which are classed as glass-forming oxides and perhaps more accurately termed "lattice-forming oxides." Hydrates of these inorganic oxides form a lattice or network structure which is in many respects comparable to the more widely known organic polymerizations. In accordance with this invention, the structure may comprise a single metal or inorganic oxide such as boron oxide, silicon dioxide, aluminum oxide, titanium oxide, zirconium oxide, tungsten oxide, molybdenum oxide, niobium oxide, tantalum oxide, chromium oxide or mixtures of the oxides or the composition may include various materials termed "intermediates" and "modifiers" in the ceramic art. The actual final melting or softening point of the ceramic structure will be dependent upon the specific composition and may be varied by incorporating the various modifiers or intermediates in the structure during the process of manufacture.

Conventional glass fibers, glass wool, mineral wool, etc., for example, used for filtration purposes, heat and sound-insulation purposes and the like are generally formed from relatively inexpensive raw materials and because they must compete with a variety of inexpensive materials, they are produced by extrusion and stretching methods, by a centrifugal disc method wherein the molten glass is extruded by centrifugal force through fine orifices in the edge of the disc or, in the case of mineral wool, the molten slag or glass flows through an aperture by gravity and a blast of steam is directed at right angles against the molten stream to disrupt the stream or atomize it and hurl the minute particles through the atmosphere where they become attenuated to form fibers. Fused quartz filaments, on the other hand, are relatively costly because of the high melting temperature and the relatively narrow plastic range which requires special manipulation and handling to form very fine fibers. As is apparent, all of these fibers are formed from a molten mass and, hence, the fibers are solid. Films or plates may be formed by an extrusion process and other structures are formed by casting techniques.

The so-called "glass fibers" and "filaments" are utilized in forming woven fabrics. However, because of the brittleness of the filaments and fibers and the high abrasion between the fibers in a yarn, it is necessary to provide special yarn finishes to reduce abrasion and special equipment is necessary in spinning and weaving operations.

The present invention provides structures formed of mixtures of a cellulosic material and a ceramic material which forms an ablative composition or combination which is capable of retaining its shaped structure under high temperature conditions at which the structure is transformed into a sintered ceramic structure.

One of the purposes of the present invention is to provide a sintered ceramic structure.

A specific purpose of the present invention is to provide a sintered ceramic fiber.

A further purpose of this invention is to provide an inexpensive and simple method for the production of ablative sinterable shaped bodies or structures.

Another purpose of the present invention is to provide an inexpensive and simple method for the production of sintered ceramic structures.

Another specific purpose of this invention is to provide an inexpensive, simple method for the production of sintered ceramic fibers and filaments.

A further object of this invention is to provide knitted and woven fabrics of sintered ceramic fibers and filaments.

Other objects and advantages of this invention will become apparent from the following description and claims which follow.

The present invention contemplates incorporating ceramic constituents or substances which will be transformed into or converted to ceramic constituents into a cellulosic solution, shaping the solution into a desired structural form by conventional procedures and removing the solvent liquid to form an ablative structure. The invention further contemplates incorporating ceramic constituents or substances which will be transformed into or converted to ceramic constituents into a cellulosic spinning solution, shaping the solution into a desired structural form, removing the solvent, and then subjecting the shaped structure to an elevated temperature to effect a pyrolysis of the cellulosic and other possible organic constituents, to oxidize or burn-off the carbon and to sinter the ceramic constituents.

The specific method of forming the shaped structure will, of course, depend upon the desired configuration of the structure. For filaments or fibers, films and plates or certain shapes which may be formed by extrusion processes, the solution will be extruded through desired orifices to provide the desired configuration. Other structures may be formed by casting techniques. These techniques are well known and therefore the invention will be described specifically as applied to the formation of filaments. Furthermore, in the manufacture and processing of fabrics, for example, a wider range of conditions may be utilized than would be normally used in forming of other shaped structures. The specific description is not intended as a limitation but is merely for illustrative purposes.

A cellulosic spinning solution containing finely divided ceramic constituents or substances which will be converted to ceramic constituents is extruded through conventional spinnerets to form the cellulosic-ceramic constituent filaments by any of the conventional spinning procedures. The solvent which may be water in the case of viscose and certain cellulose ethers or an organic solvent in the case of certain cellulose ethers and esters is removed by appropriate means. The shaped structure will be an ablative and sinterable structure. Such structure when subjected to elevated temperatures will pass through various states without alternation of its physical form. The cellulosic material will first be carbonized or converted to carbon at relatively low temperatures. If oxygen is present, the carbon them becomes oxidized or burns-off and if the temperature is sufficiently high the remaining ceramic constituents become sintered, i.e., the finely divided or minute particles are converted into a coherent filament without an actual fusing of the particles. During these transformations or reactions, the carbonization of the cellulosic material and the burning of the carbon as well as the sintering dissipate large amounts of heat and the filament retains substantially the identical form and structure. If it is desired to form the sintered ceramic filament or other structure, the structure after its formation and removal of the solvent, may be subjected to heat treatment in the presence of controlled amounts of oxygen at a temperature required for sintering or the structure may be subjected to successively higher temperatures required for pyrolysis, oxidation and burning of the carbon and finally sintering. For example, the filament or other structure may be subjected to a pyrolysis treatment at a temperature of from about 250° C. to about 500° C. The temperature may then be raised to a range of from about 550° C. to about 750° C. in the presence of oxygen or air to effect an oxidation and burning-off of the carbon or other remaining organic material. The temperature is then raised to from about 800° C. to about 1500° C. or higher and maintained within such range from 10 minutes to about 60 minutes during which period the glass-forming metal oxide and other ceramic constituents become sintered. The sintering temperature will obviously depend upon the specific ceramic constituents.

In forming the filaments or other structure, the specific cellulosic material will dictate the spinning or casting conditions and treatments to form the cellulosic material-ceramic material fibers or structure. Where viscose is used, the ceramic constituent such as the aluminum oxide, zirconium oxide, boron oxide or silicon dioxide may be introduced in the form of colloidal size particles, but are preferably introduced as sodium salts or in the form of a solution of their sodium salts. Similarly, where a cellulose ether such as, for example, an alkali-soluble, water-insoluble hydroxyethyl cellulose solution is used as the spinning solution, the ceramic constituents may be introduced in the same manner. Where organic solvent solutions of cellulose ethers or esters are used as the spinning solution, the aforementioned oxides may be introduced in colloidal sized particles but are preferably added to the spinning dope in the form of compounds such as alkyl silicates, aluminates or borates soluble in the specific solvent.

These spinning solutions containing the dispersed inorganic silicates, aluminates, borates or zirconium oxide or hydroxide or containing the dissolved silicates, aluminates or borates are then extruded through conventional spinnerets or orifices in the usual manner to form the cellulosic material filaments or other desired structural forms containing the added substances. The added substances are converted or precipitated within the filament by suitable treatment of the filaments. For example, where the added substance is sodium silicate and the spinning solution is viscose, the spinning solution is extruded into a conventional acid spinning bath to coagulate the viscose and regenerate the cellulose and simultaneously the acid reacts with the contained sodium silicate to precipitate silicic acid in an extremely finely divided and uniformly distributed form. Where an organic solvent solution of cellulose acetate, for example, is used as the base, an alkyl silicate such as tetraethyl silicate may be dissolved in the cellulose ester solution and the filaments formed by extruding the solution through conventional spinnerets in a conventional dry spinning procedure. Subsequently, the filaments are subjected to a suitable treatment with an aqueous bath containing an organic or inorganic acid which will react with the contained silicate to precipitate silicic acid in extremely finely divided form dispersed throughout the filament.

A more finely divided form of particle and more uniform distribution of the particles is obtained by incorporating the ceramic constituents in the form of soluble compounds than is obtained by adding powdered ceramic constituents. For example, a product containing both silicon dioxide and zirconium oxide may be obtained with the oxides extremely finely divided and uniformly distributed throughout the product by introducing into the viscose sodium silicate and an aqueous solution of a zirconium salt such as the sulfate. Subsequently, the filaments are dried and where the silicic acid has been precipitated, it may be converted to silica or a form of a hydrate of silica by the heat treatment. Prior to drying, the filaments may be subjected to after-treatments, such as, in the case of the regenerated cellulose filaments washing and the like as usually performed in the manufacture of viscose rayon.

The resulting filaments may be considered as ablative structures and may be used in the form of a mass or mat of fibers for thermo-insulation purposes or a filter for high temperature gases. The filaments may be utilized in forming a knitted or woven fabric for similar uses. In use at elevated temperatures, the filament may pass through several stages as described hereinabove where the cellulosic constituent is first decomposed to form carbon, then the carbon is oxidized and burned-off where air is present and finally the ceramic constituent sintered. It has not been definitely determined whether the precipitated silicic acid is transformed into silica or whether during the heating treatment to which the filaments are subjected either during processing or during use the originally precipitated silicic acid is transformed or converted to some form of hydrate of silica. In any event, the silicic acid or hydrate of silica or silica is bound together sufficiently at temperatures below the sintering temperature so that the filament or structure retains its original configuration during these heating stages. Where the temperature in use is sufficiently high, the body becomes a sintered ceramic structure. When the heat treatment is conducted at certain elevated temperatures, the specific temperature being dependent upon the specific metal or metalloid, it is possible to form the carbide of the metal or metalloid. Alternatively, the filaments after drying may be converted into sintered form by subjecting them to heat treatment either in separate steps or in a single step as described hereinabove. The filaments may be used to form a knitted or woven fabric prior to subjecting them to the necessary high temperature treatment to convert them into sintered forms.

The filaments or other structure prior to the heat treating step exhibits substantially the same physical appearance as a corresponding structure formed of the cellulosic material. For example, a filament comprising the regenerated cellulose will exhibit the same appearance as a corresponding viscose rayon filament. The body or structure when subjected to the pyrolytic treatment will remain in the same physical configuration. However, since the organic materials have been converted to carbon, the structure will be an intense black. If the pyrolytic treatment is conducted at lower temperatures, some of the surface carbon may be removed by rubbing the structure between the fingers. By heating to temperatures of at least about 550° C. in a vacuum or an inert atmosphere, the carbon may be converted into a form which will not readily rub off between the fingers.

The sintered filaments formed as described hereinbefore when examined by a light microscope exhibit a structure which is substantially identical to the structure of a viscose rayon or cellulose acetate fiber, i.e., they appear under the light microscope to be solid filaments. When examined by the use of an electron microscope, however, the longitudinal surfaces exhibit a typical sintered structure i.e., a multiplicity of minute particles bonded together at their points of contact. Examination of the cross section illustrates a typical porous sintered structure wherein the minute particles are bonded together at their points of contact. The cross section of the filament is of substantially the same contour as that of the filament before the cellulosic material has been removed by the heat treatment.

It is obvious that the sintering temperature as set forth above will vary depending upon the particular glass-forming and other ceramic substances added to the spinning solution. The specific temperature set forth above is applicable for the preparation of the silica fibers and it is obvious that higher temperatures will be required for the aluminum oxide fibers because of the higher melting point of the aluminum oxide and lower temperatures may be used for a substance such as boron oxide.

It has been found that where a bundle of filaments or fibers as such or where the filaments or fibers have been converted into a textile have been subjected to the pyrolysis, oxidation and sintering treatments, the filaments retain their individual identity and do not become bonded to each other during these operations. The sintered fibers and filaments exhibit an intense white color, and are highly lustrous, are acceptably flexible and highly resilient. The diameters of the filaments and fibers may be varied by any of the techniques common to the production of filaments of cellulosic materials.

The properties of the sintered fibers may be altered by treating the fibers during their production or before the pyrolytic treatment with modifying salts. For example, in forming the fibers from viscose solutions, the wet gel fibers after the final after treatment or washing may be passed through an aqueous solution of a salt of a modifying agent such as a water-soluble salt of magnesium, aluminum, potassium, boron and the like. Where the filaments are to be used in forming a textile, the water-soluble salt may be incorporated in a conventional yarn finish applied to the wet gel filaments, the yarn finish serving the conventional purposes in weaving and knitting apparatus. As is well known, the yarn finishes generally are aqueous dispersions or emulsions of a yarn lubricant and a surfactant and these substances will be volatilized or burned off during the subsequent pyrolysis and oxidation treatments.

Filaments and fabrics prepared as described herein have, both before and after pyrolysis, oxidation and sintering, sufficient flexibility and pliability to permit their use as a dielectric covering for electric wires, as protective clothing, as thermal-insulation material and for both liquid and gaseous filters where the fluids are at high temperatures and where ordinary fibrous materials will not withstand corrosive and high temperature conditions.

Structures, such as, for example, filaments or films formed by the viscose rayon procedure may be prepared from any desired viscose. As is well known, the viscose may contain from about 1.5% to about 15% cellulose generally from about 4% to about 10%, from about 4% to 10% caustic soda and from about 25% to about 60% carbon disulfide based upon the weight of the cellulose in the viscose. The viscose is prepared in the conventional manner and is allowed to ripen before spinning. The viscose may have any desired sodium chloride salt test at the time of spinning and this may vary from about 1.5 to about 12 or higher.

The viscose must contain a viscose or coagulation modifier such as that commonly employed in the manufacture of tire cord type viscose rayon. As is well known, the modifier may be added to the viscose during its preparation as in the mixing step before ripening or it may be added to the stream of viscose just prior to extrusion into the spinning bath by the well known injection spinning technique. A large number of modifiers are known and are in use in the production of the various types of viscose rayon. These modifiers also function as polymerization catalysts for the polymerization of the hydrate of the inorganic oxides. These modifiers include polyoxyalkylene glycols such as polyoxyethylene glycols, polyoxypropylene glycols and block copolymers of propylene and ethylene oxides; various amines including monoamines, diamines and polyamines such as diethylamine, dimethylamine, ethylene diamine and diethylenetriamine; reaction products of alkylene oxides with fatty acids, fatty alcohols, fatty amines, aromatic acids, aromatic alcohols, aromatic amines, partial esters of fatty acids and polyhydric alcohols such as reaction products of ethylene oxide with lauryl alcohol, phenol, lauryl amine, glycerol monostearate, etc.; quaternary ammonium compounds and the like. The amount of modifier may vary from about 2% to about 5%, based on the weight of the cellulose.

Specific illustrations of satisfactory modifiers are polyoxyethylene glycol having a molecular weight of from about 600 to about 6000, polyoxyethylene glycol ethers of phenol or sorbitol having a molecular weight within the stated range or a combination of such modifiers with a monoamine such as dimethylamine. Preferably, a combination of modifiers is used, the monoamine being present in an amount of from about 1.5% to 3.5% and the glycol or ether, in an amount of from about 1% to 3%, both proportions being based upon the weight of the cellulose in the viscose. Other specific examples of some of these substances are set forth in the following patents: 2,535,044; 2,536,014; 2,696,423; 2,792,278; 2,792,279; 2,792,280; 2,792,281; 2,840,448; 2,840,449; 2,841,462; 2,841,463; 2,845,327; 2,849,274; 2,852,334; 2,853,260; 2,860,480; 2,888,356; 2,890,130; 2,890,131; 2,890,132; 2,890,133; 2,892,729; 2,895,787; 2,895,788; 2,898,182 and French Pat. 1,162,737. Similarly, bath additives may be incorporated in the spinning bath to improve spinning conditions such as reduction in spinneret incrustation.

Any of the conventional acid baths may be used in shaping the structures. These baths generally contain from about 5% to about 15% sulfuric acid, from about 10% to about 25% sodium sulfate and contain a metal salt such as, for example, zinc sulfate or other metal sulfates such as iron, magnesium, nickel and the like sulfates. The temperature of the spinning bath may vary from about 20° to about 80° C., but is preferably at least 45° C. It has been found to be desirable to utilize a spinning bath containing zinc sulfate because the presence of the zinc sulfate in the spinning bath also appears to increase the strength of the filaments during the pyrolysis, oxidation and sintering operations and appears to inhibit shrinking during these heat treating stages. Preferably, the zinc sulfate is present in the spinning bath in an amount of from about 1% to about 9%.

It is not known precisely the amount of regeneration effected in the spinning bath after the extruded viscose is coagulated. As is commonly practiced, the coagulated and partially regenerated filaments, after they are withdrawn from the spinning bath, are stretched either in air or in a hot water bath or in a hot dilute acid-sodium sulfate bath. The stretching operation effects an orientation of the cellulose or other orientable polymeric material in the filaments and, in general, the stretching substantially increases the strength of viscose rayon filaments. For the purposes of the present invention, the amount of stretching may be similar to that normally used in the production of rayon, for example, the filaments may be stretched about 95% in a dilute hot sulfuric acid bath. Stretching will also affect the diameter of the filaments and, hence, the size or diameter of the sintered filaments may be regulated to some extent by the amount of stretching. It has been found that the physical properties of the sintered filaments are improved with an increase in the stretching of the filaments.

The filaments are then thoroughly washed and the wet gel filaments, where a ceramic modifying agent or intermediate is to be used, may then be passed through an aqueous solution of a modifying metal salt, or they may be treated with a yarn finish containing the dissolved metal salt and finally dried.

Filaments may be formed in the same manner by replacing the viscose solution with an alkali solution of a water-insoluble, alkali-soluble cellulose ether such as a hydroxyethyl cellulose ether.

In the aqueous systems, the lattice formers are conveniently incorporated in the spinning solution by mixing an aqueous solution or aqueous dispersion of a compound of the metal of the lattice former and the cellulosic solution. Thus, sodium silicate, aluminate or borate may be dissolved in water or may be dissolved in sodium hydroxide solution and the solution mixed directly with the viscose or cellulose ether solution. Where an aqueous solution of certain metal salts, such as, for example, an aqueous solution of zirconium sulfate, is added to the viscose, the metal salt is converted into an hydroxide, for example, zirconium hydroxide, upon addition to the alkaline viscose solution, and with agitation during the addition, becomes uniformly distributed throughout the spinning solution. Alternatively, an aqueous dispersion or suspension of zirconium hydroxide as formed by hydrolytic decomposition in water of sodium zirconate may be added to the viscose. Alternatively, but not preferably, an aqueous dispersion of finely divided silica, alumina, zirconia or boron oxide may be mixed with the viscose or cellulose ether solution. The mixing of the solutions may be effected during preparation of the viscous or cellulose ether solution or the dispersion of the glass former or solution of the glass former may be introduced by the conventional injection spinning technique, i.e., the dispersion or solution is injected into the stream of viscose and thoroughly mixed with the viscose or cellulose ether just prior to extrusion of the solution through the spinneret into the spinning bath.

In an organic spinning system, such as an organic solvent solution of a cellulose ester, the glass-forming substances may be introduced into the spinning dope either as organic solvent solutions of compounds of glass-forming substances or the finely divided glass former may be dispersed in the spinning dope in a manner similar to that described in the viscose process.

Cellulose nitrate and cellulose acetate are common cellulose esters employed in spinning or forming of filaments, films and the like and may be used in forming the products of the present invention. Other cellulose esters such as the butyrate and mixed esters such as the acetate-butyrate and organic solvent-soluble cellulose ethers are also satisfactory. The solvent employed in forming the spinning dope will obviously be dependent upon the specific organic solvent-soluble cellulosic material. Cellulose acetate spinning dopes commonly contain from about 20% to about 30% or 35% cellulose acetate dissolved in a solvent consisting of about 94% acetone and about 6% water. An organic solvent-soluble alkyl silicate such as an ethyl silicate is dissolved in the cellulose ester solution or finely divided silica, for example, is dispersed in the solution. The spinning dope is then extruded through the spinneret orifices in the conventional manner either into a warm air chamber or in a liquid system. The filaments after collection or the filaments after being converted into a fabric are then treated with an aqueous acidic solution such as aqueous hydrochloric acid containing from about 2½% to 5% hydrochloric acid whereby the ethyl silicate is decomposed to form silicic acid within the fiber in an extremely finely divided form distributed throughout the individual filaments. It is obvious that where the finely divided silica has been dispersed in the spinning dope, it is not necessary to after treat the filaments. The filaments or fabrics may be subjected to pyrolysis, oxidation and sintering operations, or to use as described in connection with the viscose process.

Cellulose nitrate may be utilized in the same manner. However, the solvent for the nitrate spinning dope would be methyl alcohol and ether.

Organic solvent-soluble cellulose ethers may be used as the cellulose base material in like manner. For example, methyl cellulose, ethyl cellulose or benzyl cellulose having a degree of substitution of about 0.5 to about 2.5 may be dissolved in dioxane, tetrahydrofurane or dimethylsulfoxide to form the spinning dope in which the glass former is dissolved or dispersed as described hereinbefore. After spinning and removal of the solvent, the filaments are subjected to a suitable acid treatment to precipitate the silicic acid where an organic solvent-soluble silicate was dissolved in the spinning dope. Filaments formed in this manner are then subjected to use or to the required pyrolysis, oxidation and sintering operations to form sintered filaments.

Where an organic solvent solution of a cellulosic material is used as the fiber-forming material, the fibers before being subjected to the pyrolysis, oxidation and sintering operations may be treated with solutions of modifying agents as described in connection with the viscose process. This class of filament may be handled on conventional textile equipment to form knitted and woven fabrics as described in connection with the filaments having a viscose rayon base. As is well known, the yarn finish commonly used on filaments and fibers to be converted to fabrics on textile equipment will be dependent upon the specific cellulosic material used as the base material for the filaments.

The amount of the lattice former added to the spinning solution or dope may vary over an appreciable range. The porosity of the filaments and other properties may thereby be regulated. The lattice forming oxide may vary from about 15% to about 75% based upon the weight of the dry product. Preferably, the lattice former is incorporated in the spinning solution or dope as a soluble compound which is subsequently decomposed or converted into the lattice former because by precipitating the lattice former in situ, it is more uniformly distributed throughout the filament, it is in a more finely divided state, possibly in a molecularly dispersed state, and polymerizes more readily than the particles which are formed by grinding and dispersing solid particles in the spinning solution or spinning dope.

The invention may be described by reference to specific examples illustrating the forming of filaments by the viscose process. However, it is to be understood that any of the cellulosic materials and their specific processing methods are equally satisfactory in forming the filaments and other structures contemplated by the present invention. Furthermore, the use of the viscose process is most convenient because many of the common glass formers are soluble in alkali solutions and, hence, are soluble in the viscose spinning solutions. The viscose contains a modifying agent and the spinning bath preferably contains a surfactant as conventionally used in the production of conventional types or classes of rayon. Ordinary commercial or technical grades of sodium silicate, sodium aluminate or sodium borate may be dissolved in the viscose in amounts to provide a metal oxide to cellulose ratio of from about 0.2:1 up to about 2:1. Zirconium dioxide may be incorporated in the viscose by adding to the viscose, while mixing, a solution of zirconium sulfate or an aqueous suspension of zirconium oxide to provide the same zirconium oxide to cellulose ratios. Merely to illustrate the invention, it may be described specifically by reference to the use of a technical grade of sodium silicate having a $Na_2O:SiO_2$ ratio of 1:3.25.

EXAMPLE I

Viscose was prepared in a conventional manner containing 7.5% cellulose, 6.5% caustic soda and 38% carbon disulfide based on the weight of the cellulose. During the mixing operation, 3.3% dimethylamine and 1.7% of a polyoxyethylene glycol ether of phenol containing an average of 15 ethylene oxide units per mole of phenol was incorporated in the viscose. A technical grade sodium silicate as described was added to the viscose to provide equal weights of silica and cellulose. The viscose was then allowed to ripen for about 24 hours at 18° C.

The viscose having a salt test of about 9 was then extruded through a spinneret to form a 1650 denier, 1500 filament yarn at the rate of about 40 meters per minute. The coagulating and regenerating bath contained 6.5% sulfuric acid, 14% sodium sulfate and 4% zinc sulfate and was maintained at a temperature of about 60° C. After an immersion length of 16 inches, the filaments were withdrawn from the spinning bath and passed over thread-advancing reels. During the passage of the filaments around the thread-advancing reels, they were stretched about 75% while being treated with a hot dilute acid solution containing about 3% sulfuric acid and were then washed with water as a temperature of about 70° C. The wet gel filaments were then treated with a yarn finishing bath consisting of an emulsion of about 1.5% mineral oil, 0.8% Silicone Oil L–45 in water containing about 0.25% of a surfactant, 0.5% gelatin, 10% magnesium sulfate, 2% aluminum sulfate and 0.5% potassium sulfate. The filaments were then passed over drying rolls and collected on a tube.

Some samples of filaments prepared in this manner were woven into a flat fabric. Other samples were woven into a tubular fabric. Tubular fabrics, placed over ceramic cores to provide a slight tension in the fabric, a mass of loose filaments and flat fabrics were all then subjected to heat treatment. It was desired to produce sintered structures so that the heat treatment was conducted in a muffle furnace at a temperature of about 900° C. and the samples were maintained at this temperature for 30 minutes. Upon removal of the products from the furnace and cooling to room temperature, the filaments exhibited a surprising whiteness, luster, resilience and flexibility. The filaments and fabrics while having a somewhat harsh feel were extremely flexible and pliable. The filaments retained their individual identities and were not cemented or adhered together.

Under the light microscope, the dried filaments prior to heat treatment exhibited a typical kidney-bean shaped cross section and a smooth, non-crenulated exterior surface. After pyrolysis, oxidation and sintering, the filaments exhibited substantially the same cross sectional and longitudinal appearance under the light microscope. When examined by means of the electron microscope at a magnification of about 100,000, the longitudinal appearance is that typical of a sintered body. The cross section illustrates a typical porous sintered structure. The individual particles appeared to be within the range of about 100 A. to about 1000 A. units in size.

Filaments having like structures and characteristics have been formed with the cellulose spinning solutions wherein the silicate to cellulose ratio varied within the range as hereinbefore set forth.

EXAMPLE II

Viscose was prepared in a conventional manner containing 6.4% cellulose, 7.1% caustic soda and 38% carbon disulfide based on the weight of the cellulose. A technical grade sodium silicate as described above was added to the viscose in an amount sufficient to provide 3.7% $SiO_2$ which theoretically should provide about 36.5% $SiO_2$ based on the weight of the dry finished product. The viscose was then allowed to ripen for about 24 hours at 18° C.

The viscose was then extruded through a spinneret to form a 840 denier, 980 filament yarn at a rate of about 40 meters per minute. The spinning bath contained 7.15% sulfuric acid and 12.5% sodium sulfate and was maintained at a temperature of about 48° C. After an immersion length of 16 inches, the filaments were withdrawn from the spinning bath and passed through and stretched about 38% in a cascade water bath containing about 3% sulfuric acid and 4.7% sodium sulfate maintained at a temperature of about 94° C. The filaments were then passed over thread-advancing reels where they were allowed to relax 1½% to 5% and washed with water having a temperature of about 59° C. The filaments were then passed through a yarn finish bath consisting of an aqueous solution of about 2.4% of an ethoxylated castor oil containing an average of about 200 ethylene oxide units per mole of castor oil (Atlas G–1300) and 1.6% of a mixture of a fatty acid ester of sorbitol and an ethoxylated castor oil (Atlas TL–174). The filaments were then passed over drying rolls and collected on a tube.

A mass of loose filaments was placed on a ceramic plate and introduced into a muffle furnace. After purging the furnace atmosphere with argon, the furnace temperature was brought up to about 925° C. and maintained at this temperature for about 1.5 hours. Upon removal from the furnace, the residue amounted to 0.36% of the weight of the dried filaments introduced into the muffle furnace. Upon carefully removing the ceramic plate from the furnace, the residue consisted of a white powder. Some of the powder particles appeared to be arranged as a filament but this residue was extremely weak and could not be handled as a filamentary material.

In the absence of a modifier in the viscose capable of serving as both a viscose modifier and a polymerization catalyst, substantially all of the silica originally present in the viscose was removed in the spinning bath and the hot dilute acid solution used in the treatment of the filaments during the stretching stage.

EXAMPLE III

Viscose was prepared in a conventoinal manner containing 5.0% cellulose, 6.95% caustic soda and 39% carbon disulfide based on the weight of the cellulose. During the mixing operation, 2.6% dimethylamine and 1.3% of a polyoxyethylene glycol ether of phenol containing an average of 15 ethylene oxide units per mole of phenol was incorporated in the viscose. The amount of the additives was based upon the weight of the cellulose in the viscose. A technical grade sodium silicate as described above was added to the viscose to provide 4.1% $SiO_2$ which theoretically should provide about 45.2% $SiO_2$ based on the weight of the finished product. The viscose was then allowed to ripen for about 24 hours at 18° C.

The viscose was then spun into a 800 denier, 980 filament yarn in the same spinning bath and subjected to the same after treatments and stretching as in Example II with the exception that the temperature of the wash water was 29° C.

A mass of loose filaments was then placed on a ceramic plate and introduced into a muffle furnace. After purging the furnace atmosphere with argon, the furnace temperature was brought up to about 925° C. and maintained at this temperature for about 1.5 hours. Upon removal from the furnace, the residue amounted to 0.18% of the weight of the dried filaments introduced into the muffle furnace. Upon caefully removing the ceramic plate from the furnace, the residue consisted of a white powder. Some of the powder particles appeared to be arranged as a filament but this residue was extremely weak and could not be handled as a filamentary material.

Although modifying agents were present which function both as a viscose modifier and a silica polymerization catalyst the absence of a zinc salt or other metal salt from the spinning bath prevented the polymerization of the silica in the extruded filaments and, for all practical purposes, the silica was removed from the filaments in the spinning bath and by the hot dilute acid solution.

EXAMPLE IV

Viscose was prepared in a conventional manner and allowed to ripen for about 24 hours at 18° C. A commercial grade of sodium aluminate (about 65% sodium aluminate) was dissolved in water to form a solution containing 8.5% sodium aluminate. Before spinning the viscose, sufficient sodium aluminate solution was added to and thoroughly mixed with the viscose to provide an aluminum oxide to cellulose ratio of 1:1. The final spinning solution contained, by weight:

|  | Percent |
|---|---|
| Cellulose | 5.12 |
| Sodium hydroxide | 14.13 |
| Aluminum oxide | 5.00 |
| Carbon disulfide (based on cellulose) | 40.00 |
| Dimethylamine | 2.6 |
| Phenol-glycol ether of Example I | 1.6 |

The viscose having a salt test of about 9 was extruded through a spinneret to form a 1650 denier, 1500 filament yarn at the rate of about 40 meters per minute. The coagulating and regenerating bath contained 7.5% sulfuric acid, 14% sodium sulfate and 2% zinc sulfate and was maintained at a temperature of about 60° C. After an immersion length of 16 inches, the filaments were withdrawn from the spinning bath and passed over thread-advancing reels. During the passage of the filaments around the thread-advancing reels, they were stretched about 75% while being treated with a hot dilute acid solution containing about 3% sulfuric acid and were then washed with water at a temperature of about 70° C. The wet gel filaments were then treated with the yarn finishing bath as described in Example I. The filaments were then passed over drying rolls and collected on a tube.

A mass of loose filaments were then subjected to heat treatment in a muffle furnace to produce sintered structures. The furnace was first purged of air with argon and the heat treatment was conducted at a temperature of about 925° C. and the samples were maintained at this temperature for 3 hours. Upon removal of the products from the furnace and cooling to room temperature, the filaments exhibited a whiteness, luster, resilience and flexibility similar to that of the silicon containing filaments. The filaments while having a somewhat harsh feel were extremely flexible and pliable. The filaments retained their individual idenities and were not cemented or adhered together.

The appearance of the filaments under the light microscope and under the electron microscope at a magnification of about 100,000 both before and after firing was substantially the same as the filaments of Example I.

EXAMPLE V

Viscose was prepared in a conventional manner. A technical grade sodium silicate as described in Example I was added to the viscose to provide a silica to cellulose ratio of 0.5:1. The viscose was then allowed to ripen for about 24 hours at 18° C.

A dispersion of zirconium hydroxide was formed by dissolving zirconium sulfate ($ZrSO_4 \cdot 4H_2O$), mixing the solution with a caustic soda solution containing carboxymethyl cellulose as a dispersing agent and subjecting the mixture to a ball milling operation for 72 hours. The dispersion was formed of 505 parts zirconium sulfate ($ZrSO_4 \cdot 4H_2O$), 25 parts of carboxymethyl cellulose and 1700 parts of 7% caustic soda solution, the parts being based on weight. The dispersion was introduced into the viscose by the well known injection system just before the viscose reached the spinneret. The amount of the dispersion was sufficient to provide a ratio of zirconium oxide to cellulose of 0.5:1. The spinning solution contained, by weight:

|  | Percent |
|---|---|
| Cellulose | 5 |
| Silica | 2.5 |
| Zirconia | 2.5 |
| Sodium hydroxide | 7.0 |
| Carbon disulfide (based on cellulose) | 40.0 |
| Dimethylamine | 2.6 |
| Phenol-glycol ether of Example I | 1.3 |

The viscose had a salt test of about 9 and the spinning solution was extruded through a spinneret to form a 1650 denier, 1500 filament yarn at a rate of about 40 meters per minute. The coagulating and regenerating bath contained 7% sulfuric acid, 20% sodium sulfate and 4% zinc sulfate and was maintained at a temperature of about 60° C. After an immersion length of 16 inches, the filaments were withdrawn from the spinning bath and passed over thread-advancing reels. During the passage of the filaments around the thread-advancing reels, they were stretched about 75% while being treated with a hot dilute acid solution containing about 3% sulfuric acid and were then washed with water at a temperature of about 70° C. The wet gel filaments were then treated with the yarn finishing bath as described in Example I. The filaments were then passed over drying rolls and collected on a tube.

A mass of loose filaments prepared in this manner were placed in an oven and heated for 3 hours at a temperature of 375°–380° C. The filaments were then transferred to a muffle furnace at a temperature of about 925° C. and the samples were maintained at this temperature for 3 hours. Upon removal of the products from the furnace and cooling to room temperature, the filaments exhibited a whiteness, luster, resilience and flexibility similar to that of the filaments of Example I. The filaments retained their individual identities and were not cemented or adhered together.

The appearance of the filaments under the light microscope and under the electron microscope at a magnification of about 100,000 both before and after firing was about the same as the filaments of Example I.

EXAMPLE VI

A viscose-sodium silicate solution was prepared as described in Example I. A quantity of the solution was poured onto a glass plate and spread across the plate to provide a layer of approximate uniform thickness. The plate was then immersed in a viscose coagulating and regenerating bath containing 6.5% sulfuric acid, 2% zinc sulfate and 20% sodium sulfate. The bath was at a temperature of about 75° C. and the coated plate held in the bath for about 20 minutes. After removal from the bath, the coating on the plate was thoroughly washed in water, stripped from the plate and dried. The film was translucent in appearance.

The film was then placed between quartz plates and the assembly heated to about 600° C. for about 3 hours. The assembly was then transferred to a muffle furnace and heated to about 900° C. for 3 hours. Upon removal from the furnace and cooling to room temperature, the film exhibited a rather brilliant whiteness and luster but was brittle. The film was approximately 0.0015 inch in thickness.

EXAMPLE VII

A sample of an unfired woven fabric (2 ply, 1650 d. yarns, 18 x 18 weave) as described in Example I was clamped between the two sections of an open-top, rectangular mold. Molten aluminum at a temperature of about 800° C. was poured into both sides of the mold cavity. The mold and molten aluminum were maintained at the elevated temperature until all gassing had ceased. The temperature was sufficiently high to carbonize the regenerated cellulose, however, since the fabric was protected from the atmosphere, the carbon was not burned-off.

The fabric was securely bonded between the two layers of metal.

Alternatively, the fabric may be subjected to the heat treatments necessary to convert the filaments to the sintered form and such treated fabric utilized as a reinforcing means for a metal in somewhat the same manner as fabric is used in molded resinous products. This is illustrated by the following example:

EXAMPLE VIII

A sample of woven sintered fabric (2 ply, 1650 d. yarns, 18 x 18 weave) as described in Example I was clamped between the two sections of an open-top, rectangular mold. Molten lead at a temperature of about 400° C. was poured into both sides of the mold cavity. The mold and molten lead were maintained at the elevated temperature until all gassing had ceased.

The fabric was securely bonded between the two layers of lead.

EXAMPLE IX

A series of viscose samples were prepared containing varying amounts of tungstic oxide. In the preparation of the samples, the viscose was prepared in a conventional manner and the tungstic oxide introduced in the form of a stock solution of sodium tungstate, $Na_2WO_3 \cdot 2H_2O$. After thorough mixing of the viscose and the tungstate solution, the viscose in each instance was ripened for about 24 hours at 18° C.

The amount of sodium tungstate added to the viscose was varied in the different samples so as to provide filaments containing from 10% to 200% tungstic oxide based upon the weight of the cellulose. All samples were prepared with 2.6% dimethylamine and 1.3% of a polyoxyethylene glycol ether of phenol as described in Example I. The composition of the samples was as shown in Table I, the percentage of caustic soda in each instance representing the total sodium hydroxide and includes the sodium hydroxide contributed by the sodium tungstate.

TABLE I

| Sample | A | B | C | D | E | F | G |
|---|---|---|---|---|---|---|---|
| Cellulose, percent | 5.5 | 5.5 | 5.0 | 5.5 | 5.0 | 5.0 | 5.0 |
| NaOH, percent | 6.9 | 6.9 | 6.9 | 6.9 | 3.0 | 3.0 | 3.0 |
| $SC_2$, percent | 38 | 38 | 39 | 36 | 38 | 38 | 38 |
| $WO_3$, percent | 0.55 | 1.1 | 4.1 | 4.5 | 6.0 | 8.0 | 10.0 |

All samples—2.6 dimethylamine and 1.3% phenol-ethylene oxide ether

The viscose samples were each extruded through a spinneret to form a 1650 denier, 1500 filament yarn at a rate of about 40 meters per minute. The spinning bath contained 6.25% sulfuric acid, 2.0% zinc sulfate and 25% sodium sulfate and was maintained at a temperature of about 65° C. After an immersion length of 16 inches, the filaments were withdrawn from the spinning bath and passed through and stretched about 70% in a cascade water bath containing about 3% sulfuric acid, 1.0% zinc sulfate and 4.0% sodium sulfate maintained at a temperature of about 93° C. The filaments were then passed over thread-advancing reels where they were allowed to relax 2% to 5% and washed with water having a temperature of about 60°. The filaments were then treated with a yarn finish bath consisting of an aqueous solution of about 3% of a polyoxyethylene derivative of castor oil containing an average of about 200 ethylene oxide units per mole of castor oil. The filaments were then passed over drying rolls and collected on a tube.

Under the light microscope, the dried filaments exhibited a typical rayon type cross section having crenulated exterior surfaces.

Samples of the various filaments were placed in a muffle furnace and after purging the atmosphere with argon, the furnace temperature was raised to about 500° C. Different samples were maintained in the furnace at this temperature for periods varying from 6 hours to 65 hours. After the particular heat treating period, the filaments were allowed to cool before removal from the furnace. All of the samples after firing exhibited a filament structure which was yellow in color indicating that the products consisted largely of tungstic oxide. The overall strength characteristics obviously varied depending upon the relative proportion of tungstic oxide in the different samples. The recovered filaments varied from about 8% to about 41% by weight of the filaments as introduced into the furnace. Certain samples of filaments were woven into a textile fabric and small swatches of fabrics were also subjected to a similar heat treating or firing operation. For example, a swatch of fabric made from the filaments derived from Sample E after a 24 hour firing or heat treatment showed a yield of about 22% and exhibited a shrinkage in both directions of about 34%.

A large sample of fabric formed of the filaments derived from Sample E was rolled up and placed in a furnace. After purging the furnace with an atmosphere consisting of 5% methane and 95% nitrogen, this atmosphere was passed through the furnace at a rate of 4.5 liters per minute. The furnace temperature was then raised to 1050° C. over a 23 hour period. The furnace was then held at this temperature for about one hour and power to the furnace discontinued while maintaining the gas flow through the furnace. The roll of fabric was cooled slowly over a period of about 3 hours and when the fabric temperature had dropped to 110° C., the roll of fabric was water quenched. The roll of fabric was subsequently oven dried at a temperature of about 105° C. The product was a black appearing fabric. An X-ray diffraction examination of the heat treated or fired fabric indicated that the fabric consisted essentially of a mixture of the two forms of tungsten carbide, WC and $W_2C$.

The fabrics after the heat treatments at either 500° C. or 1050° C., like the silica and other fabrics described hereinbefore, exhibit the filamentary patterns of the unfired fabrics but are not as flexible and pliable as those of the silica and silica-carbon fabrics.

These fabrics have sufficient overall physical characteristics so that they may be impregnated with high temperature resistant phenolic resins and subsequently used in forming laminated products of various configuration for use under high temperature, erosive conditions. The fabrics such as the oxide fabrics or the carbide fabrics when used in this fashion in the preparation of molded laminates are used in the same manner as prior glass and carbon fabrics. In general, the molded products of this type may contain from about 25% to about 45% of the resin.

Sintered filaments having diameters of about 3.5 microns have been formed by the method as described.

For the production of ablative structures, a further increase in resistance to high temperature conditions is obtained by incorporating in the cellulosic matrix a high temperature resistant synthetic resin such as epoxy resins, phenolic resins, urea-formaldehyde resins and the like which are well known in the art. Generally, the resins may be incorporated in the spinning solutions by conventional injection spinning methods or by impregnating the shaped article during processing with a solution or dispersion of the resin. The resin is preferably in the precondensate form and polymerizes and becomes a thermoset resinous material during processing of the filaments.

The presence of this class of resinous material distributed throughout the structure improves the strength of the ablative structures and provides another organic constituent which will dissipate considerable energy when it decomposes at high temperatures. Where it is desired to form a sintered ceramic body, the resins obviously would not be employed because in the absence of the resins, the structures have sufficient strength to permit the necessary heat treatments. In such case, the incorporation of the resin would merely add to the cost of production without imparting any appreciable benefits.

As pointed out hereinabove, it is not known with certainty in which precise form or combination the glass- or lattice-forming compounds occur in the dried, cellulosic base products and in the heat treated products. It would appear that in the manufacture of the products, the glass- or lattice-forming oxides are probably first present as acids, for example, in the case of incorporating an alkali metal silicate in a viscose solution, silicic acid is first formed during treatment of the shaped body or structure in the acid bath. Upon drying of the product, water is removed. However, it is believed that the temperatures are not sufficiently high to remove all water and, hence, the silicon is present probably in the form of a hydrate of silica. It is believed that it is this form which imparts sufficient strength to the bodies by a bonding or possible polymerization between the particles so that the shaped article retains its shape and form when the organic material is carbonized and burned-off.

Similarly, the mechanism and action in forming like products by introducing the glass-forming compounds in the form of finely divided powders may follow somewhat the same pattern, at least in the aqueous systems. For example, when the very finely divided silica is incorporated in a viscose solution, it is possible that at least the surface portions of the particles become hydrated sufficiently to form a hydrate of silica or possibly silicic acid during spinning of the viscose into the acid bath. In the subsequent treatment, the hydrate of silica is sufficient to bond together the particles so that the shaped structure retains its shape and form during the subsequent heat treatment.

The foregoing brief interpretation is merely offered as a possible explanation and is not intended to limit the invention in any way.

A fibrous structure, such as the ablative, sinterable fabric of Example VII may be utilized to form a product such as that described in Example VIII where a sintered structure is embedded or bonded between layers of metal. The fabric is secured in a frame and the frame and fabric gradually immersed in molten metal. The rate of immersion may be sufficiently low so that as the fabric comes into contact with the molten metal, the cellulose is decomposed and the carbon burned-off. The metal may be maintained at a temperature sufficient to sinter the glass-forming oxide present in the fabric.

I claim:
1. As an article of manufacture, a fibrous, sinterable structure comprising as continuous phases a cellulosic material and at least one polymerized lattice-forming inorganic oxide hydrate each of which is uniformly distributed throughout the fibrous structure, the ratio of oxide to cellulosic material being between about 0.2:1 to about 2:1, the fibrous structure being further characterized in that upon removal of either phase, the other phase retains the configuration of the fibrous structure.

2. As an article of manufacture, a shaped and sinterable structure comprising as continuous phases carbon and at least one polymerized lattice-forming inorganic oxide each of which is uniformly distributed throughout the structure, the structure being further characterized in that upon removal of either phase, the other phase retains the configuration of the structure.

3. An article of manufacture as defined in claim 2 wherein the shaped structure is a fibrous structure.

4. An article of manufacture as defined in claim 3 wherein the fibrous structure is bonded to a layer of metal.

5. As an article of manufacture, a fibrous structure comprising at least one sintered metal carbide, the metal being characterized in that its metal oxide hydrate is a polymerizable lattice-forming metal oxide hydrate.

6. An article of manufacture as defined in claim 5 wherein the fibrous structure is bonded to a layer of metal.

7. A method of forming a shaped structure which comprises forming a mixture of an aqueous cellulosic solution, at least one inorganic compound convertible to a polymerizable lattice-forming inorganic oxide hydrate and a polymerization catalyst, the amount of inorganic compound being sufficient to provide a ratio of inorganic oxide to cellulosic material of between about 0.2:1 to about 2:1, shaping the mixture into the desired structural configuration and simultaneously converting the inorganic compound into a polymerizable lattice-forming inorganic oxide hydrate and polymerizing the inorganic oxide hydrate to form the shaped structure wherein the cellulosic material and polymerized lattice-forming inorganic oxide hydrate are uniformly distributed throughout the structure as continuous phases and drying the structure.

8. The method as defined in claim 7 wherein the aqueous cellulosic solution is viscose and the polymerization catalyst is also a viscose modifier.

9. The method as defined in claim 8 wherein the dried structure is heated in an inert atmosphere to decompose and convert the cellulose to carbon.

10. The method as defined in claim 8 wherein the dried structure is heated to decompose and oxidize the carbon and sinter the polymerized lattice-forming inorganic oxide.

11. The method as defined in claim 8 wherein the dried structure is heated in an inert atmosphere to decompose and convert the cellulose to carbon and to react the inorganic oxide and carbon to form an inorganic carbide.

References Cited
UNITED STATES PATENTS

| | | | |
|---|---|---|---|
| 689,337 | 12/1901 | Waite | 106—81 |
| 2,271,316 | 1/1942 | Spurrier | 106—41X |
| 2,446,872 | 8/1948 | Ehlers | 264—63 |
| 2,616,165 | 11/1952 | Brennan | 29—183 |
| 2,772,444 | 12/1956 | Burrows et al. | 260—17.4X |
| 3,055,831 | 9/1962 | Barnett et al. | 260—15X |
| 3,177,057 | 4/1965 | Potter et al. | 65—18X |
| 3,110,545 | 11/1963 | Beasley et al. | 264—56X |

HAROLD ANSHER, Primary Examiner

G. W. MOXON II, Assistant Examiner

U.S. Cl. X.R.

65—18; 106—165; 161—151, 220; 264—63, 188

UNITED STATES PATENT OFFICE
CERTIFICATE OF CORRECTION

Patent No.  3,565,749          Dated  February 23, 1971

Inventor(s)  Irvin Wizon

It is certified that error appears in the above-identified patent and that said Letters Patent are hereby corrected as shown below:

Col. 1, line 26, "organic" should read --inorganic--; line 39, "or" should read --of--; line 51, "structure" should read --structures--; line 54, "termed" should read --term--. Col. 4, line 43, the word "as" should be inserted following the word "or". Col. 7, line 50, "viscous" should read --viscose--. Col. 9, line 38, "as" should read --at--. Col. 11, line 4, "caefully" should read --carefully--. Col. 13, TABLE I, under "Sample" --SC$_2$, percent-- should read --CS$_2$, percent--. Col. 14, line 2, "60°" should read --60°C.--; line 13, "furnare" should read --furnace--.

Signed and sealed this 20th day of July 1971.

(SEAL)
Attest:

EDWARD M. FLETCHER, JR.
Attesting Officer

WILLIAM E. SCHUYLER,
Commissioner of Pate